United States Patent
Murano

(10) Patent No.: US 9,477,248 B2
(45) Date of Patent: Oct. 25, 2016

(54) DIRECT-CURRENT POWER SUPPLY UTILIZING SYSTEM AND DIRECT-CURRENT MICROGRID NETWORK UTILIZING SAME

(75) Inventor: Minoru Murano, Hokkaido (JP)

(73) Assignee: SION ELECTRIC CO., LTD., Hokkaido (JP)

( * ) Notice: Subject to any disclaimer, the term of this patent is extended or adjusted under 35 U.S.C. 154(b) by 381 days.

(21) Appl. No.: 14/237,453

(22) PCT Filed: Sep. 26, 2011

(86) PCT No.: PCT/JP2011/005372
§ 371 (c)(1),
(2), (4) Date: Feb. 6, 2014

(87) PCT Pub. No.: WO2013/046244
PCT Pub. Date: Apr. 4, 2013

(65) Prior Publication Data
US 2014/0183949 A1    Jul. 3, 2014

(51) Int. Cl.
*H02J 1/00* (2006.01)
*G05F 3/02* (2006.01)
(Continued)

(52) U.S. Cl.
CPC . *G05F 3/02* (2013.01); *G05F 1/67* (2013.01); *H02J 1/00* (2013.01); *H02J 3/36* (2013.01); *H02J 3/385* (2013.01); *Y02E 10/58* (2013.01);
(Continued)

(58) Field of Classification Search
CPC ........................................................ H02J 1/00
USPC ..................................................... 307/9.1, 43
See application file for complete search history.

(56) References Cited

U.S. PATENT DOCUMENTS

2002/0195136 A1* 12/2002 Takabayashi ..... H01L 31/02021
136/244
2007/0159866 A1*  7/2007 Siri ................... H02M 3/33592
363/95
(Continued)

FOREIGN PATENT DOCUMENTS

EP    1 239 576 A2    9/2002
EP    1 919 054 A2    5/2008
(Continued)

OTHER PUBLICATIONS

International Search Report issued Feb. 14, 2012 in corresponding International Application No. PCT/JP2011/005372.

*Primary Examiner* — Robert DeBeradinis
(74) *Attorney, Agent, or Firm* — Wenderoth, Lind & Ponack, L.L.P.

(57) ABSTRACT

A direct-current power supply utilizing system includes: at least one direct-current power supply that produces a direct-current output; an alternating-current commercial power supply; a direct-current converter that converts the alternating-current commercial power supply into direct-current power; and a direct-current load device that receives supply of direct-current power from both at least one direct-current power supply and the commercial power supply which has been converted into direct-current power, where a back-flow prevention diode is individually connected between the at least one direct-current power supply and the direct-current load device and between the direct-current converter and the direct-current load device, and a power supply priority supply device that preferentially supplies power to the direct-current load device from the side of the direct-current power supply is connected.

18 Claims, 10 Drawing Sheets

(51) Int. Cl.
   *G05F 1/67* (2006.01)
   *H02J 3/36* (2006.01)
   *H02J 3/38* (2006.01)

(52) U.S. Cl.
   CPC ............. *Y02E 60/60* (2013.01); *Y10T 307/352* (2015.04); *Y10T 307/549* (2015.04)

(56) References Cited

U.S. PATENT DOCUMENTS

2009/0115393 A1   5/2009   Yoshida et al.
2012/0249065 A1*  10/2012  Bissonette ............ B60L 11/184
                                                          320/109

FOREIGN PATENT DOCUMENTS

| | | |
|---|---:|---:|
| JP | 6-178461 | 6/1994 |
| JP | 10-84630 | 3/1998 |
| JP | 3147257 | 3/2001 |
| JP | 2002-272094 | 9/2002 |
| JP | 3394996 | 4/2003 |
| JP | 3488348 | 1/2004 |
| JP | 2004-280220 | 10/2004 |
| JP | 3149024 | 3/2009 |
| JP | 2009-117658 | 5/2009 |
| JP | 2009-273210 | 11/2009 |
| JP | 2011-181055 | 9/2011 |
| JP | 2011-223651 | 11/2011 |

* cited by examiner

FIg. 4

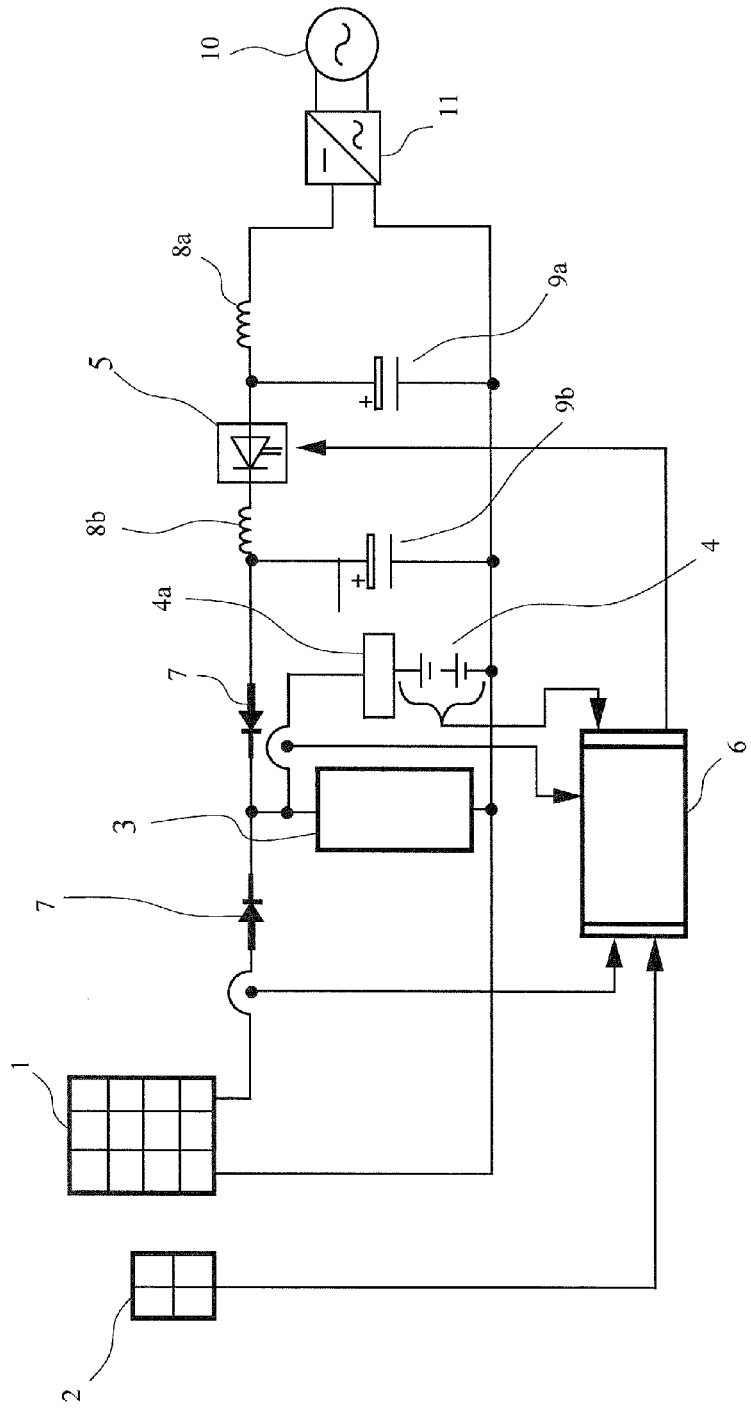

1 SOLAR BATTERY
2 AUXILIARY SOLAR BATTERY
3 DIRECT-CURRENT LOAD DEVICE
4 CAPACITOR
4a CHARGE/DISCHARGE CONTROL DEVICE
5 PULSE WIDTH MODULATION DIRECT-CURRENT CHOPPER
6 MICROCOMPUTER
7 BACK-FLOW PREVENTION DIODE
8a SMOOTHING REACTOR
8b HIGH-FREQUENCY REACTOR
9a SMOOTHING CAPACITOR
9b HIGH-FREQUENCY CAPACITOR
10 COMMERCIAL POWER SUPPLY
11 COMMERCIAL POWER SUPPLY RECTIFIER

Fig. 6

3 POWER SUPPLY

|    | TERMINAL VOLTAGE[V] | CURRENT [mA] | DIODE VOLTAGE DROP | LOAD TERMINAL VOLTAGE[V] | LOAD CURRENT[mA] |
|----|---------------------|--------------|--------------------|--------------------------|------------------|
| E1 | 12.30               | 24.78        | 0.555              | 11.61                    | 45.55            |
| E2 | 12.25               | 6.450        | 0.550              |                          |                  |
| E3 | 12.26               | 14.32        | 0.541              |                          |                  |

Fig. 7

2 POWER SUPPLY

|  | TERMINAL VOLTAGE[V] | CURRENT [mA] | DIODE VOLTAGE DROP | LOAD TERMINAL VOLTAGE[V] | LOAD CURRENT [mA] |
|---|---|---|---|---|---|
| E1 | 12.32 | 36.00 | 0.571 | 11.59 | 45.47 |
| E2 | 12.26 | 9.510 | 0.570 |  |  |
|  |  |  |  |  |  |
| E2 | 12.25 | 14.47 | 0.591 | 11.56 | 45.35 |
| E3 | 12.27 | 31.75 | 0.573 |  |  |
|  |  |  |  |  |  |
| E3 | 12.26 | 15.88 | 0.546 | 11.69 | 45.53 |
| E1 | 12.30 | 29.60 | 0.563 |  |  |

DIRECT-CURRENT POWER SUPPLY UTILIZING SYSTEM AND DIRECT-CURRENT MICROGRID NETWORK UTILIZING SAME

TECHNICAL FIELD

The present invention relates to a direct-current power supply utilizing system that converts alternating-current commercial power into direct-current power and that prioritizes, when combining the direct-current power converted from the commercial power with other direct-current power from a direct-current power supply such as a solar battery to feed out it directly to a direct-current load device, the direct-current power from the solar battery side and a direct-current microgrid network that utilizes such a system.

BACKGROUND ART

In recent years, due to global warming, in all fields, it has been required to develop eco-friendly products with consideration given to the environment and eco-friendly systems.

In particular, in the field of power supply, since it is directly connected with global warming, power supply that is clean without generation of carbon dioxide is required.

Hence, in recent years, particular attention has been focused on wide use of solar batteries utilizing solar energy which is unlikely to be exhausted and in which there is no worry about generation of carbon dioxide.

Incidentally, there are broadly two types of method of utilizing solar batteries. One method is to provide a power conditioner and utilize generated power in coordination with a so-called alternating-current power supply system.

The other method is to connect generated direct-current power without being processed directly to a direct-current load device and to utilize it.

However, even in either case, it is mandatory to prioritize the generated power from the solar battery and perform maximum power point follow control.

Here, the generated power from the solar battery depends on the amount of solar radiation of sunlight, and it is impossible to stably supply power to a load, using only the solar battery as the power supply. Hence, it is required to use not only a type of solar battery that exceeds an electrical load capacity but also a storage battery.

Moreover, as a method of supplementing the power supply from the unstable solar battery, there is a system that converts general alternating-current commercial power into direct-current power to achieve power coordination and that supplies power to an electrical load from the side of the general commercial power converted into the direct-current power when the amount of solar radiation of sunlight is low or when power generation from the solar battery cannot be expected such as at night (see, for example, patent documents 1, 2 and 3).

However, disadvantageously, the conventional system described above is not designed such that in particular, the power supply from the solar battery is preferentially performed, and that even when the amount of solar radiation is changed, the maximum generated power from the solar battery side can be used.

Conventionally, for example, a maximum generated power point follow control method (generally referred to as a MPPT control method) is performed in which control is performed such that when the solar battery is utilized at the time of charging of a storage battery or for power supply to a power load, the generated power is maximized. As its main control method, there is a known "mountain climbing method" in which the product of an output voltage and an output current from the solar battery is calculated, and an operating point where the resulting value is maximized is gradually searched for and utilized (see, for example, patent document 4).

Furthermore, there is proposed a method of determining the maximum power point with a control method in which in a device for generating hydrogen as the energy source of a fuel battery, a DC chopper is provided between a solar battery and an electrical load with a method where a solar battery voltage is made to follow the optimum operating voltage, attention is focused on the pulsating component of a circuit current and the measurement value of a current sensor is prevented from being saturated (see, for example, patent documents 4 and 5 and non-patent document 1).

Incidentally, in recent years, there has been worry about rapid progress of global warming, and in all fields, it has been required to develop eco-friendly products with consideration given to the environment and eco-friendly systems.

In particular, in the field of power supply, since main power plants and power generation devices are directly connected with global warming, in recent years, a power generation device that is clean without generation of carbon dioxide has been required to be particularly developed.

In recent years, attention has been focused on wide use of solar batteries utilizing solar energy which is unlikely to be exhausted and in which there is no worry about generation of carbon dioxide. In recent years, the development and the wide use of a microgrid network including the solar battery have been required.

Incidentally, the microgrid network refers to an energy system network in which, on a plurality of small dispersed power supplies, power supply storage devices and the like within an energy supply region, effective system operation and control are performed using IT related technologies, and thus efficiency and supply reliability are enhanced. In other words, it can be said to be a small-sized power supply system network.

Its conception has been developed and proposed in the U.S., where there are a large number of small-sized communities separate from normal power systems consisting of large-sized power generation facilities such as nuclear power, thermal power and hydropower and power grids.

Here, as compared with a method of using power from a large-sized power plant, the microgrid network described above is introduced, and thus it is possible to establish an energy supply facility that is a backup at the time of emergency. It is also possible to cut a peak in an existing large-sized power plant. Furthermore, it is possible to reduce the amount of greenhouse gas emitted and energy costs. Effects such as a small amount of energy loss since an energy facility with consideration given to the situation of the region where it is introduced can be established is also expected.

Moreover, in the conventional microgrid, raid variations in load within the network degrade the quality of the power system, such as variations in voltage.

RELATED ART DOCUMENT

Patent Document

Patent document 1: Japanese Utility Model Registration Number 3149024 "Commercial power injection type solar battery direct-current coordinated utilization system"

Patent document 2: Japanese Patent Number 3488348 "Direct-current power supply device using solar battery and method of controlling same"

Patent document 3: Japanese Patent Number 3147257 "System coordinated power supply system"

Patent document 4: Japanese Unexamined Patent Application Publication No. 2009-117658 "Solar power generation control device and method of evaluating power in solar power generation control"

Patent document 5: Japanese Patent Number 3394996 "Maximum power operating point follow method and device of same"

Patent document 6: Japanese Unexamined Patent Application Publication No. 2009-273210

Non-Patent document 1: MPPT control method of a solar power generation system using a stepdown DC-DC converter, Electrical equipment Journal 28(12), (Serial number 303), Pages 962 to 967

DISCLOSURE OF THE INVENTION

Problems to be Solved by the Invention

As described above, in order to enhance the rate of utilizing the solar battery, the method (hereinafter abbreviated as the MPPT control) of controlling the operation such that the generated power is constantly maximized is adopted, and as its typical one, the conventional solar power generation system has the maximum power point follow control method called "mountain climbing method."

This control method is a method in which as shown in the relationship between the output voltage of the solar battery and the output power of the solar battery of FIG. 1, while the electrical load of the solar battery is gradually changed in a stepwise manner, power is calculated from the measurement values of the voltage value and the current value of the solar battery, and thus the point (referred to as the optimum operating point) where the generated power is maximized is searched for.

However, the accuracy of the control described above is significantly affected by the accuracy of an AD converter used for the measurement of the voltage and the current, internal noise within a device or the like, and this disadvantageously affects the speed of convergence into the optimum operating point in the MPPT control method.

Furthermore, disadvantageously, when the steps changed for changing the electrical load of the solar battery in a stepwise manner are large, a continuous unsteady amplitude occurs, and the convergence into the optimum operating point is unstable whereas when the steps changed are small, it takes a long time to converge into the optimum operating point, especially when the amount of solar radiation is often changed, it is difficult to utilize the solar battery at the optimum operating point.

Furthermore, since in the MPPT method, in order to determine the searching in rapid response according to the amount of solar radiation and the change of the external environment of the solar battery temperature, a few types of conditional branches are needed, with the result that it is difficult to realize smooth control in a conventional analogue circuit method.

Hence, although a microcomputer (hereinafter shortly referred to as a micon) is adopted in order to effectively utilize digital control and reduce the manufacturing cost, since the processing speed of a normal micon is not fast, the processing time of a control computation algorithm is excessive, and this disadvantageously degrades the accuracy of the control.

In a method in which a power conditioner (hereinafter shortly referred to as a powercon) is provided to coordinate direct-current power produced in a conventional solar battery with a power supply system, since its operation is stopped when the amount of solar radiation is decreased, the rate of utilization of the solar battery is reduced. It is obvious that since at the time of so-called reverse power flow in which power is made to flow into the system, the voltage drop is reduced by the decrease of a line current, the voltage of a power distribution line is increased to degrade a power reverse power flow operation and the distribution condition specification of the line voltage is degraded.

When viewed from the side of power transmission, a leading power factor load is produced to cause a voltage rise at the end of power reception. Moreover, when a solar battery utilizing system capable of performing reverse power flow is provided nearby, it may be impossible to obtain a reverse power flow power amount assumed by the increase in the line voltage, with the result that a trouble on the contract of installation is likely to occur.

In particular, the generated power of the solar battery utilizing system that focuses on power selling is increased to increase its introduction price, and the increased introduction price is excessively high, with the result that it is impossible to recover the purchasing price with previously expected power selling.

In particular, although in a reverse power flow solar battery utilizing system for an ordinary household, it is possible to sell power at a high price, since in a business office, the power selling price is equal to the power purchasing price and a power consumption time range is in the daytime, it is said that power selling does not function effectively. Hence, in a solar battery utilizing system in an ordinary office, in order to reduce the purchasing price and the installation cost, it is preferable to use a solar battery utilizing system without a power reverse power flow function.

Hence, the present invention is designed to cope with the conventional various types of problems described above, and has an object to provide a direct-current power supply utilizing system that first and preferentially can supply direct-current power from a solar battery in particular, and that can use generated power from the solar battery as much as possible even when the amount of solar radiation is changed.

The present invention has an object to provide a direct-current power supply utilizing system which is, as compared with the MPPT control method that is the conventional control method described above, is not significantly affected by the accuracy of the AD converter used for the measurement of the voltage and the current, internal noise within the device or the like, without disadvantageously affecting the speed of convergence into the optimum operating point in the conventional MPPT control method, and furthermore, the direct-current power supply utilizing system in which it is possible to solve the following problem: as in the conventional control method, when the steps changed for changing the electrical load of the solar battery in a stepwise manner are large, a continuous unsteady amplitude occurs, and the convergence into the optimum operating point is unstable whereas when the steps changed are small, it takes a long time to converge into the optimum operating point, especially when the amount of solar radiation is often changed, it is difficult to utilize the solar battery at the optimum operating point; furthermore, since in the conventional MPPT method, in order to determine the searching in rapid response according to the amount of solar radiation and the change of the external environment of the solar battery temperature, a few types of conditional branches are needed, with the result that it is difficult to realize smooth control in the conventional analogue circuit method; although a micon is adopted in order to effectively utilize digital control and reduce the manufacturing cost, since the processing speed of the normal micon is not fast, the processing time of the control computation algorithm is excessive, and this disadvantageously degrades the accuracy of the control. The present invention also has an object to provide a direct-current power supply utilizing system that can avoid a phenomenon in which in a method in which a powercon is provided to coordinate direct-current power produced in the conventional solar battery with the power supply system, since its operation is stopped when the amount of solar radiation is decreased, the rate of utilization of the solar battery is reduced, and since at the time of so-called reverse power flow in which power is made to flow into the system, the voltage drop is reduced by the decrease of the line current, the voltage of the power distribution line is increased to degrade the power reverse power flow operation and the distribution condition specification of the line voltage is degraded.

In other words, the present invention can form a solar battery utilizing system that can utilize the generated power from the solar battery as much as possible in terms of a large number of places, such as offices, where they can be installed and actual use, even at the time of a small amount of solar radiation, that simplifies control without a reverse power flow function and that is inexpensive.

The solar battery utilizing system is also a system that is effective in a digital method where an inexpensive micon is used to reduce the production cost and that prevents variations in the operation and an unstable operation when the MPPT control is performed.

Furthermore, since a solar battery panel is expensive, in order to economically enhance the reduction of the installation cost, it is possible to provide a reliable control method that can utilize, even at the time of a small amount of solar radiation, the generated power from the solar battery as much as possible.

As described above, the present invention provides, in the power utilizing system formed with a plurality of direct-current power supplies including the solar battery, the simple control method that can utilize, as much as possible, power generated by the amount of solar radiation even if which is especially changed, that is, even if which is decreased. Consequently, it is possible to reduce the installation cost, to stably supply power to a direct-current load and to significantly enhance its power supply performance.

Furthermore, the present invention has an object to provide a direct-current power supply utilizing system and a direct-current microgrid network utilizing such a system which are obtained by further advancing the microgrid network described above and in which all power from a power supply is converted into direct-current power, it is possible to combine and supply the direct-current power from them, load devices on the side of reception of the supply are designed to be all direct-current operating load devices in the microgrid network and it is possible to control the following situations where efficiency and cost reduction can be achieved by preferentially using, at present, which one of a plurality of direct-current power generation devices, direct-current power supply devices and the commercial power supply converted into a direct current and by determining how these power supplies are combined to perform power supply and where it is further possible to routinely and safely feed out stable direct-current power.

Means for Solving the Problem

A direct-current power supply utilizing system and a direct-current microgrid network utilizing such a system according to the present invention are characterized in that they include at least one direct-current power supply that produces a direct-current output; an alternating-current commercial power supply, a direct-current converter that converts the alternating-current commercial power supply into direct-current power supply, and a direct-current load device that receives supply of direct-current power from both the at least one direct-current power supply and the commercial power supply which has been converted into direct-current power, where a back-flow prevention diode is individually connected between the at least one direct-current power supply and the direct-current load device and between the direct-current converter and the direct-current load device, and a power supply priority supply device that preferentially supplies power to the direct-current load device from a side of the direct-current power supply is connected, or they are characterized in that the power supply priority supply device is a voltage adjustment device that is connected to a side of the commercial power supply which has been converted into direct-current power, or they are characterized in that they include at least one direct-current power supply that produces a direct-current output, an alternating-current commercial power supply, a direct-current converter that converts the alternating-current commercial power supply into direct-current power supply, and a direct-current load device that receives supply of direct-current power from both the at least one direct-current power supply and the commercial power supply which has been converted into direct-current power, where a back-flow prevention diode is individually connected between the at least one direct-current power supply and the direct-current load device and between the direct-current converter and the direct-current load device, and a power supply priority supply device that preferentially supplies power to the direct-current load device from a side of the direct-current power supply is connected, and the at least one direct-current power supply that produces the direct-current output is a solar battery, and the solar battery includes a solar radiation amount detection member that detects a varying amount of solar radiation and a generated power amount control device that can utilize, from the detected value, as much as possible, power generated from the solar battery according to the varying amount of solar radiation, or they are characterized in that the solar radiation amount detection member is formed with a solar battery panel of the solar battery or is formed with a solar battery formed with another solar battery panel, or they are characterized in that the generated power amount control device is a control device that can obtain, for the generated power of the solar battery which is increased or decreased according to the varying amount of solar radiation, the maximum generated power corresponding to the varying amount of solar radiation, a graph is previously formed in which a variation in the amount of solar radiation in the solar battery is on a horizontal or vertical axis and a variation in the maximum output current value from the solar battery at the time of the maximum generated power corresponding to the variation in the amount of solar radiation is on the vertical or horizontal axis, the maximum output current value at the time of the maximum generated power in 1000 W/square meters at the time of the maximum amount of solar radiation in the solar battery is determined and is placed at one point on the graph and the one point and an origin of the graph are connected, and a linear target value of the maximum output current value indicating the maximum generated power of the solar battery corresponding to the varying amount of solar radiation is formed, the varying amount of solar radiation detected by the solar radiation amount detection member and an actual output current value obtained from the solar battery corresponding to the amount of solar radiation value are detected and the power supply priority supply device is operated to perform control such that the obtained actual output power value is to be an output current target value corresponding to the amount of solar radiation value obtained from the graph, or they are characterized in that the power supply priority supply device is formed with a pulse width modulation direct-current chopper that is a voltage adjustment device, performs a proportional derivative integral control computation to determine a conduction ratio of the pulse width modulation direct-current chopper, performs current adjustment with the conduction ratio determined by the computation and performs control such that the actual output current value from the solar battery is to be the output current target value, or they are characterized in that the direct-current power supply includes a direct-current power supply that is obtained by full-wave rectifying the commercial power supply or converting the commercial power supply into direct-current power with a pulse width modulation DC converter, a direct-current wind generator or a direct-current wind generator that is obtained by full-wave rectifying if the wind generator performs alternating-current power generation, a direct-current fuel battery, a direct-current bio-gas generator, and a storage battery including a capacitance or charge/discharge control device, or they are characterized in that they include a plurality of direct-current power generation devices that combine and feed out direct-current power and that generate direct-current power, an alternating-current commercial power supply that has been converted into direct-current power, a direct-current operating load device that receives supply of the combined direct-current power, and a direct-current bus that connects the direct-current power generation devices, the commercial power supply and the direct-current operating load device, where a priority use order table of power supply is provided in the direct-current power generation devices such that the direct-current power supply to the direct-current operating load device can be performed in ascending order of a power generation cost, and a power supply control device is included that detects a real-time power generation amount of the direct-current power generation devices corresponding to the real-time power generation cost in the direct-current power generation devices, that references the detection result and the priority use order table to determine a real-time optimum supply selection order of the direct-current power generation devices and that supplies power to the direct-current load device, or they are characterized in that the direct-current power supply to the direct-current operating load device by combining the direct-current power is performed by individually attaching a back-flow prevention diode to the direct-current power generation devices which generate the direct-current power and the alternating-current commercial power supply which has been converted into direct-current power, then combining the direct-current power supplied therefrom and supplying the combined direct-current power, or they are characterized in that they include a plurality of direct-current power generation devices that generate direct-current power, a direct-current power supply device that outputs direct-current power, an alternating-current commercial power supply that has been converted into direct-current power, at least one direct-current operating load device that receives supply of direct-current power combined by the direct-current power generation devices, the direct-current power supply device and the commercial power supply which has been converted into direct-current power, and a direct-current bus that connects the direct-current power generation devices, the direct-current power supply device, the commercial power supply and the direct-current operating load device, where a priority use order table of power supply is provided in the direct-current power generation devices, the direct-current power supply device and the commercial power supply which has been converted into direct-current power such that the direct-current power supply to the direct-current operating load device can be performed in ascending order of a power generation cost, and a power supply control device is included that detects a real-time power supply allowable amount of the direct-current power generation devices, the direct-current power supply device and the commercial power supply which has been converted into direct-current power corresponding to the real-time power generation cost in the direct-current power generation devices, the direct-current power supply device and the commercial power supply which has been converted into direct-current power, that references the detection result and the priority use order table to determine a real-time optimum supply selection order of the direct-current power generation devices, the direct-current power supply device and the commercial power supply which has been converted into direct-current power and that supplies power to the direct-current load device, or they are characterized in that the direct-current power supply to the direct-current operating load device by combining the direct-current power is performed by individually attaching a back-flow prevention diode to the direct-current power generation devices which generate the power, the direct-current power supply and the alternating-current commercial power supply which has been converted into direct-current power, then combining the direct-current power supplied therefrom and supplying the combined direct-current power, or they are characterized in that the direct-current power generation devices include at least a solar battery, a fuel battery, a wind generator, a hydroelectric generator and a bio-gas generator, or they are characterized in that the direct-current power supply device is a power storage device including a car battery, or they are characterized in that in the commercial power supply, a reverse conversion device capable of performing power reverse power flow is provided, and the reverse conversion device performs the reverse power flow on the commercial power supply when an amount of power generated by a plurality of direct-current power generation devices which generate the power of the direct-current microgrid network exceeds an amount of power consumed by the direct-current operating load device and an amount of power stored in the direct-current power supply.

Effects of the Invention

In the direct-current power supply utilizing system and the direct-current microgrid network utilizing such a system according to the present invention, it is possible to first and preferentially supply direct-current power from a solar battery in particular, and to use generated power from the solar battery as much as possible even when the amount of solar radiation is changed.

As compared with the MPPT control method that is the conventional control method described above, the direct-current power supply utilizing system is not significantly affected by the accuracy of the AD converter used for the measurement of the voltage and the current, internal noise within the device or the like, and without disadvantageously affecting the speed of convergence into the optimum operating point in the conventional MPPT control method, and furthermore, it is possible to solve the problem in that, as in the conventional control method, when the steps changed for changing the electrical load of the solar battery in a stepwise manner are large, a continuous unsteady amplitude occurs, and the convergence into the optimum operating point is unstable whereas when the steps changed are small, it takes a long time to converge into the optimum operating point, especially when the amount of solar radiation is often changed, it is difficult to utilize the solar battery at the optimum operating point.

Furthermore, it is possible to solve the problem in that since in the conventional MPPT method, in order to determine the searching in rapid response according to the amount of solar radiation and the change of the external environment of the solar battery temperature, a few types of conditional branches are needed, with the result that it is difficult to realize smooth control in the conventional analogue circuit method.

Moreover, it is possible to solve the problem in that although a micon is adopted in order to effectively utilize digital control and reduce the manufacturing cost, since the processing speed of the normal micon is not fast, the processing time of the control computation algorithm is excessive, and this disadvantageously degrades the accuracy of the control.

Furthermore, it is possible to avoid a phenomenon in which in a method in which a powercon is provided to coordinate direct-current power produced in the conventional solar battery with the power supply system, since its operation is stopped when the amount of solar radiation is decreased, the rate of utilization of the solar battery is reduced, and since at the time of so-called reverse power flow in which power is made to flow into the system, the voltage drop is reduced by the decrease of the line current, the voltage of the power distribution line is increased to degrade the power reverse power flow operation and the distribution condition specification of the line voltage is degraded.

In other words, the present invention can form a solar battery utilizing system that can utilize the generated power from the solar battery as much as possible in terms of a large number of places, such as offices, where they can be installed and actual use, even at the time of a small amount of solar radiation, that simplifies control without a reverse power flow function and that is inexpensive.

Moreover, it is possible to provide a system that is effective in a digital method where an inexpensive micon is used to reduce the production cost and that prevents variations in the operation and an unstable operation when the so-called control is performed.

Furthermore, since a solar battery panel is expensive, in order to economically enhance the reduction of the installation cost, it is possible to provide a reliable control method that can utilize, even at the time of a small amount of solar radiation, the generated power from the solar battery as much as possible.

As described above, the present invention provides, in the power utilizing system formed with a plurality of direct-current power supplies including the solar battery, the simple control method that can utilize, as much as possible, the generated power from the solar battery even if the amount of solar radiation is changed, and thus it is possible to reduce the installation cost, to stably supply power to a direct-current load and to significantly enhance its power supply performance.

In other words, by the control method of operating the solar battery at the optimum operating point according to the present invention, the computation processing time is reduced, for example, it is possible to decrease periodic intervals in the pulse width modulation direct-current chopper, with the result that it is possible to decrease a filter, an inductance, a capacitance and their values that reduce power pulsation caused by the turning on and off of the direct-current power supply and thereby reduce the manufacturing cost of the system.

Moreover, since the control execution time is short, even if the amount of solar radiation is suddenly changed, the solar battery is rapidly moved to the optimum operating point to enhance the efficiency of utilizing the solar battery.

Moreover, since all can be formed with inexpensive components, it is possible to reduce the manufacturing cost.

Furthermore, the microgrid network is provided which can convert all the power from the power supplies into direct-current power, can change the priority use order and the combination ratio of the direct-current power therefrom and thereby can perform the combination and supply, and in which all load devices on the side of reception of the supply are formed with the direct-current operating load devices, and consideration is given to which one of a plurality of direct-current power generation devices, the direct-current power supply devices and the commercial power supply that has been converted into direct-current power is prioritized at present, how these power supplies are combined to supply power more efficiently and inexpensively and safety, and it is possible to determine the stable supply to perform control efficiently.

BRIEF DESCRIPTION OF DRAWINGS

FIG. 4 A configuration illustrative diagram illustrating the configuration of the direct-current power supply utilizing system according to the present invention;

FIG. 6 A configuration illustrative diagram illustrating the basic configuration of the direct-current power supply utilizing system according to the present invention (part 2);

FIG. 7 A configuration illustrative diagram illustrating the basic configuration of the direct-current power supply utilizing system according to the present invention (part 3);

BEST MODE FOR CARRYING OUT THE INVENTION

Example 1

A preferred embodiment of a direct-current power supply utilizing system according to the present invention will be described with reference to drawings.

Figure 1:
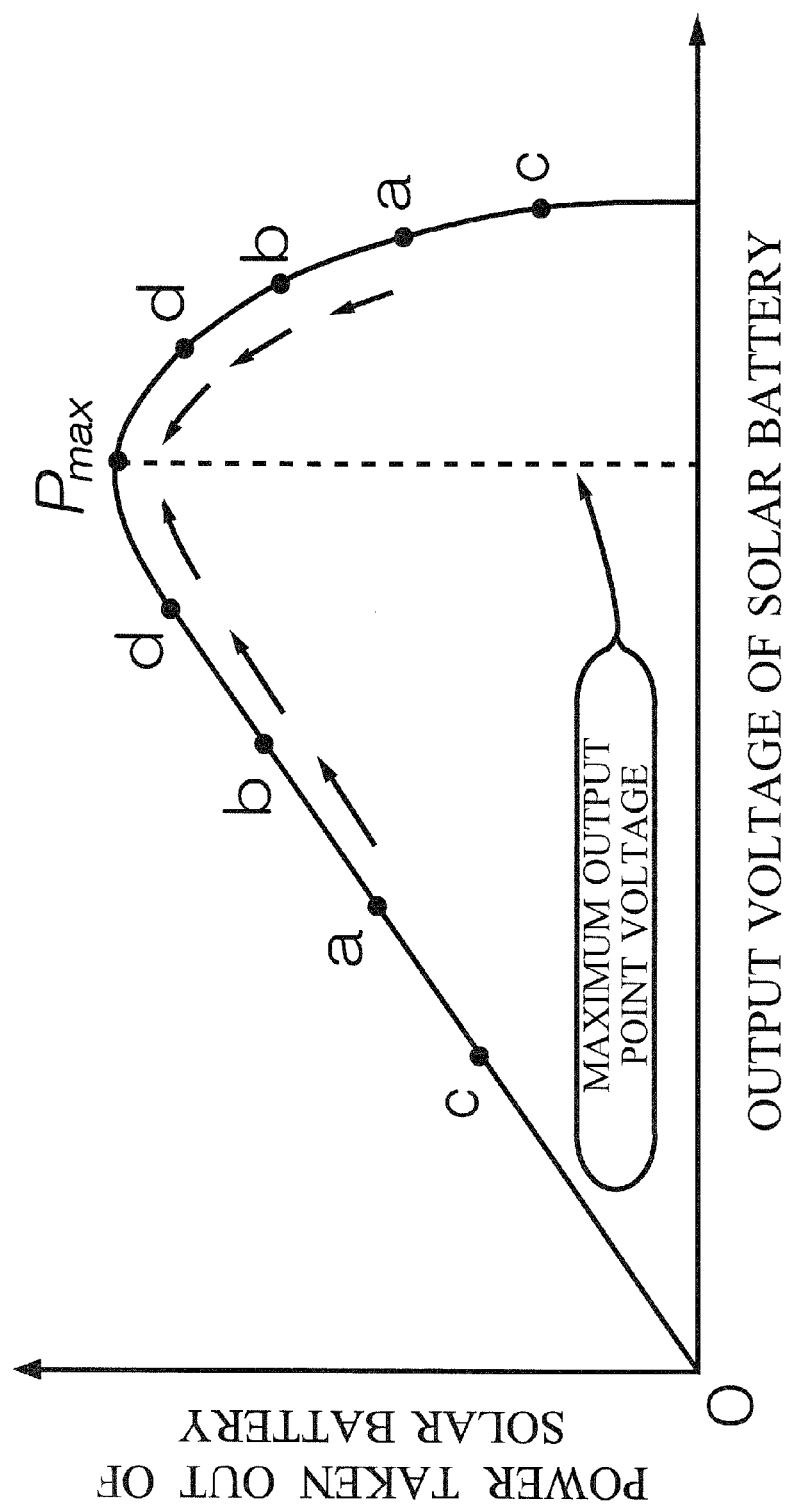
FIG. 1 An illustrative diagram illustrating a V-P characteristic on the maximum generated power point of a solar battery.
Figure 2:
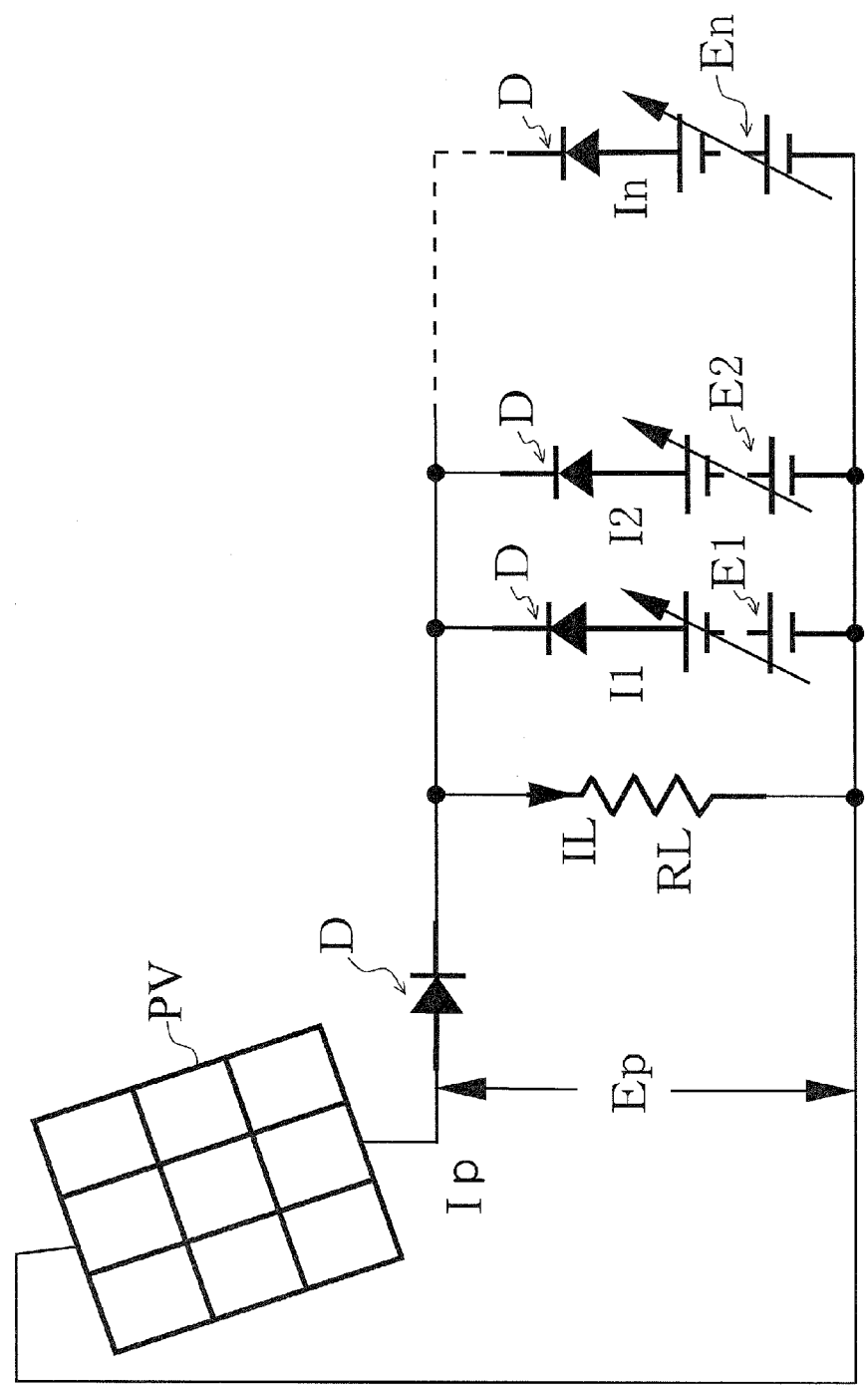
FIG. 2 An illustrative diagram illustrating the circuit of a basic configuration of a direct-current power supply utilizing system according to the present invention.

FIG. 2 will first be described. FIG. 2 shows a circuit in which, in addition to a solar battery PV, n voltage-variable direct-current power supplies E1, E2, . . . and En are connected through back-flow prevention diodes D.

This is obtained by generalizing a solar battery power generation utilizing system, that is, the direct-current power supply utilizing system, and the direct-current power supplies E1, E2, . . . and En may be obtained by rectifying commercial power or may be storage batteries, wind power generation direct-current power supplies or capacitors. The direct-current power supplies E1, E2, . . . and En are designed on condition that each of the direct-current power supplies E1, E2, . . . and En is provided with an output voltage adjustment device (not shown in FIG. 2).

Although in electromagnetics, the branch current of each direct-current power supply is calculated by the application of "Kirchhoff's law", when each branch has the back-flow prevention diode D, the distribution of current is completely different.

Specifically, when all the output voltages of the direct-current power supplies E1, E2, . . . and En other than the solar battery PV are zero, a load current Ip=Ep/RL from only the solar battery PV flows through a so-called direct-current load device RL. In this case, Kirchhoff's first law holds true.

Then, for example, when the voltage of the direct-current power supply E1 is increased from zero to E1 (where E1<Ep), I1=E1/R flows from the direct-current power supply E1.

However, it is assumed that the internal resistance of E1 is so low as compared with a load resistor R that it is possible to ignore it. Here, a load current IL is not changed, and the current Ip from the solar battery PV is decreased by only I1.

The same phenomenon occurs when the voltage of the other direct-current power supplies E2 . . . and En is increased. However, it should be noted that, when the direct-current power supplies E1, E2, . . . and En whose voltages are higher than the voltage Ep of the solar battery PV are connected, a load terminal voltage is increased by the direct-current power supplies E1, E2, . . . and En. Hence, when a system in which the load current Ip is preferentially fed out from the solar battery PV to the side of the direct-current load device RL is designed, it is necessary to adjust the output voltage of the direct-current power supplies E1, E2, . . . and En with the output voltage adjustment device such that the voltage is lower than the voltage Ep of the solar battery PV.

As described above, the load terminal voltage is ruled by the direct-current power supply having the highest output voltage among all the direct-current power supplies E1, E2, . . . and En including the solar battery PV. Here, the current of the present direct-current power supply is maximized.

It can be understood from what has been described above that the current Ip of the solar battery PV can be controlled by adjusting the magnitude of the voltage of the other direct-current power supplies E1, E2, . . . and En.

A further specific description will be given.

A description will be given with reference to FIG. 5. The back-flow prevention diodes D are respectively connected to three direct-current power supplies E1, E2 and E3, and the combined direct-current power is output to the direct-current load device RL.

Which one of the outputs from the direct-current power supplies E1, E2 and E3 is prioritized is performed by making the terminal voltages differ. Specifically, as shown in FIG. 6, a setting is made such that the terminal voltage of E1 is 12.30 V, the terminal voltage of E2 is 12.25 V and the terminal voltage of E3 is 12.26 V.

At the terminal voltages described above, currents shown in FIG. 6 flowed through the direct-current power supplies E1, E2 and E3. Specifically, a current of 24.78 mA flowed through E1, a current of 6.450 mA flowed through E2 and a current of 12.26 mA flowed through E3. As described above, it is understood that the current flows in descending order of the terminal voltage.

Hence, which one of the outputs from the direct-current power supplies E1, E2 and E3 is prioritized can be selected and determined by connecting the back-flow prevention diodes D and making the terminal voltages differ.

The direct-current power supplies shown here may be alternating-current commercial power supplies that have been subjected to conversion or a plurality of direct-current power supplies formed with power storage devices, such as a car battery or a battery, that output direct-current power.

FIG. 7 is a graph when two power supplies out of the direct-current power supplies E1, E2 and E3 are used, and it can be understood that the current flows in descending order of the terminal voltage.

Example 2

An example where, when direct-current power generated from a solar battery 1 and direct-current power generated from direct-current power supplies other than the solar battery 1 are combined and are fed out to a direct-current load device 3, the power generated from the solar battery 1 can be utilized as much as possible will now be described.

Figure 3:
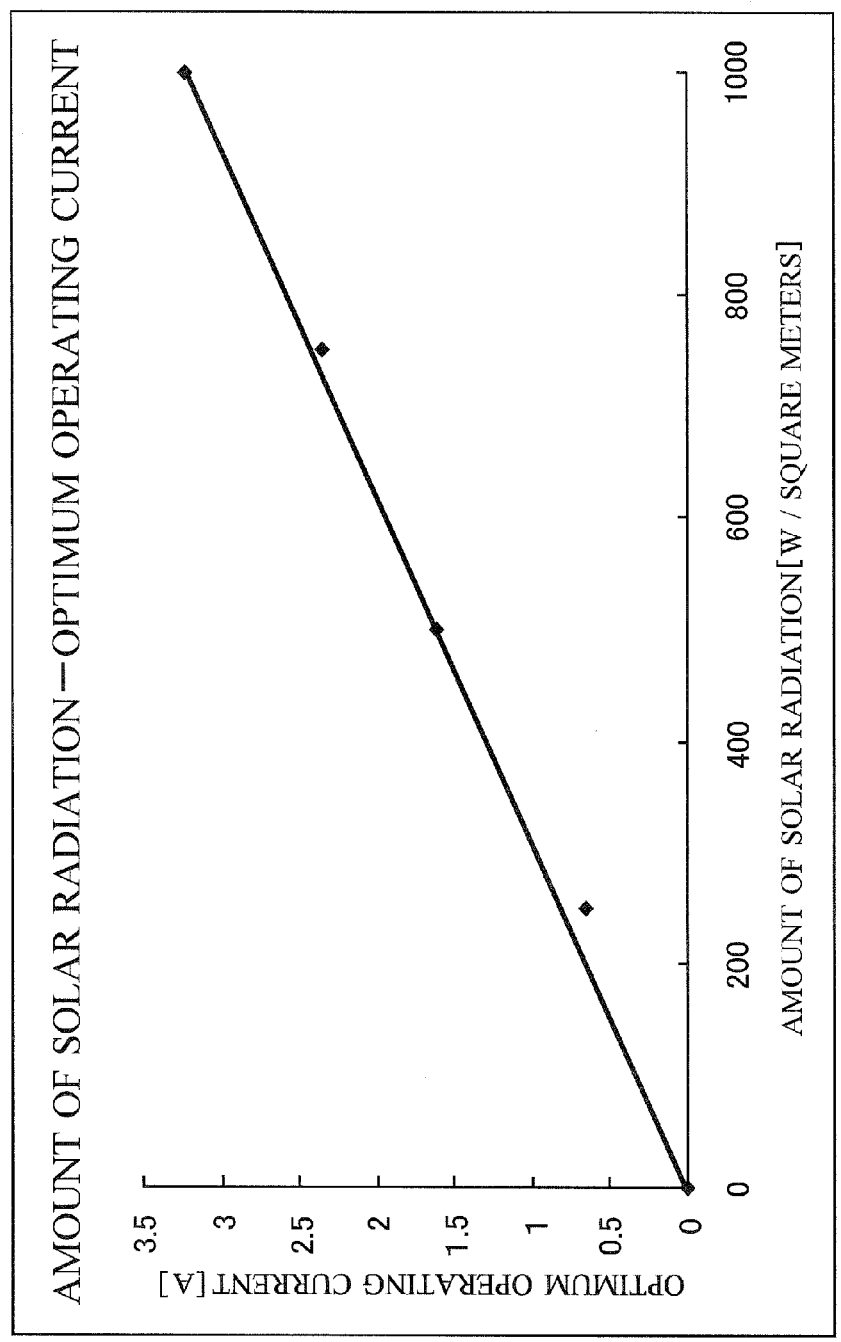
FIG. 3 An illustrative diagram illustrating the characteristic of the amount of solar radiation—the maximum power generation optimum operating current in the direct-current power supply utilizing system according to the present invention.

FIG. 3 shows a graph of an approximate linear relationship of the amount of solar radiation-optimum operating current obtained from the voltage-current characteristic of the solar battery 1 per amount of solar radiation.

Points (four points) in the graph shown in FIG. 3 are the maximum generated power points at the amounts of solar radiation. The four points are points that indicate the values of the optimum operating currents indicating the maximum generated power points at the amounts of solar radiation that are individually changed, and that have been actually measured by a complicated measurement method.

The straight line shown in the graph is a straight line obtained by connecting a point at which the solar battery 1 is at the maximum generated power point (the maximum generated power point is replaced by the optimum operating current, which is about 3.3 (A) here) at the time of the maximum amount of solar radiation (1000 W/square meters) and a point (origin point) at which the amount of solar radiation is zero.

Then, the above four points actually measured by the complicated measurement method are substantially in approximate positions on the straight line described above, and it is found that there is not a significant difference. Hence, the present inventors have found that the graph can be utilized, and have invented that it is possible to perform control utilizing this graph with a simple configuration.

Specifically, the amount of solar radiation is first continuously detected with an auxiliary solar battery 2. Although in the present example, the amount of solar radiation is detected with the auxiliary solar battery 2 that is provided separately, the amount of solar radiation may be detected with the solar battery 1.

The changed amount of solar radiation is found, and thus the graph described above is utilized to substantially determine the maximum generated power at the present amount of solar radiation, that is, the optimum operating current, with the result that it is possible to easily control the solar battery 1.

FIG. 4 shows the solar battery utilizing system of the present invention, that is, the direct-current power supply utilizing system.

In the example shown in FIG. 4, symbol 10 represents an alternating-current commercial power supply, and the alternating-current commercial power supply 10 is converted by a commercial power supply rectifier 11 into direct-current power. Although in the present example, one commercial power supply 10 is connected, a plurality of commercial power supplies 10 may be connected.

Here, in FIG. 4, symbol 3 represents a direct-current load device, symbol 4 represents a capacitor, symbol 5 represents a pulse width modulation direct-current chopper, symbol 6 represents a microcomputer, symbol 7 represents a back-flow prevention diode, symbol 8a represents a smoothing reactor, symbol 8b represents a high-frequency reactor, symbol 9a represents a smoothing capacitor and symbol 9b represents a high-frequency capacitor.

Only when load is relatively low on the direct-current load device 3 or it is not necessary to supply power, the storage battery 4 is charged, and when amount of solar radiation is low or it is necessary to supply power to the direct-current load device 3 at a time of low amount of solar radiation or nighttime, power from the storage battery 4 is used though a charge/discharge control device 4a. When the power generated by the solar battery 1 is not stored, it is not necessary to provide the storage battery 4.

Here, the auxiliary solar battery 2 continuously detects the changed amount of solar radiation, and data on the detected amount of solar radiation is fed to the microcomputer 6.

A current 1a from the solar battery 1 is also fed through, for example, the AD converter to the microcomputer 6.

Hence, the microcomputer 6 takes in and recognizes the data on the constantly changed amount of solar radiation and the current value 1a indicating the amount of power generated by the solar battery 1 at the present amount of solar radiation.

Hence, the current value 1a is controlled to be the optimum current value represented by the graph shown in FIG. 3.

Specifically, an optimum operating point current Ip* corresponding to the amount of solar radiation is obtained from the approximate straight line in FIG. 3.

On the other hand, by computation based on formulas below, the conduction ratio d (specifically indicating an on time during a chopper period) of the pulse width modulation direct-current chopper 5 on the side of the commercial power supply 10 converted into direct-current power is determined, and is output from the microcomputer 6.

$$e(k)=Ip^*-Ip(k) \qquad \text{(Formula 1)}$$

$$\Delta d(k)=Kpe(k)+Ki\Sigma_{k=0}^{k}e(k)+Kd\{e(k)-e(k-1)\} \qquad \text{(Formula 2)}$$

$$d(k)=d(k-1)+\Delta d(k) \qquad \text{(Formula 3)}$$

Here, e (k) in formula 1 represents an error between the optimum operating point current Ip* and the current Ip (k) of the solar battery 1.

By formula 2, that is, a so-called digital PID control computation formula, a control amount Δd (k) for adjusting the conduction ratio of the pulse width modulation direct-current chopper 5 at the subsequent control time is determined, this value is added to the previous conduction ratio d (k−1) and is corrected and processing for bringing Ip (k) closer to Ip* is performed by formula 3.

Kp, Ki and Kd in formula 2 respectively represent the coefficients of proportional control, integral control and derivative control.

What has been described above can be said to be the so-called simple MPPT control method in the present invention.

Here, on the side of the solar battery 1 and the commercial power supply 10 that has been converted into direct-current power, the back-flow prevention diodes 7 are connected opposite each other, and power is supplied to the direct-current load device 3.

As has already been described, the changed amount of solar radiation is taken in by the auxiliary solar battery 2, and the current 1a of the solar battery 1 is taken in through, for example, the AD converter to the microcomputer 6.

Hence, the conduction ratio d is output from these values using formulas 1 to 3 to the pulse width modulation direct-current chopper 5, and thus the so-called control is performed.

As the device that converts alternating-current power such as the commercial power supply 10 into direct-current power and that is the so-called commercial power supply rectifier 11, a full-wave rectifier or a pulse width modulation direct-current converter is used, and in order to absorb a pulsating flow generated by these devices, the smoothing reactor 8a and the smoothing capacitor 9a described above are used. Moreover, in order to smooth a rectangular voltage of the pulse width modulation direct-current chopper 5, the high-frequency reactor 8b and the high-frequency capacitor 9b are inserted.

When the amount of solar radiation is sufficient, load on the direct-current load device 3 is low or it is not necessary to supply power, it is also possible to store power in the storage battery 4 through the charge/discharge control device 4a. It is possible to supply, at nighttime or the like, power to the direct-current load device 3 through the storage battery 4.

Example 3

An embodiment of the direct-current microgrid network according to the present invention will now be described with reference to drawings.

Figure 8:
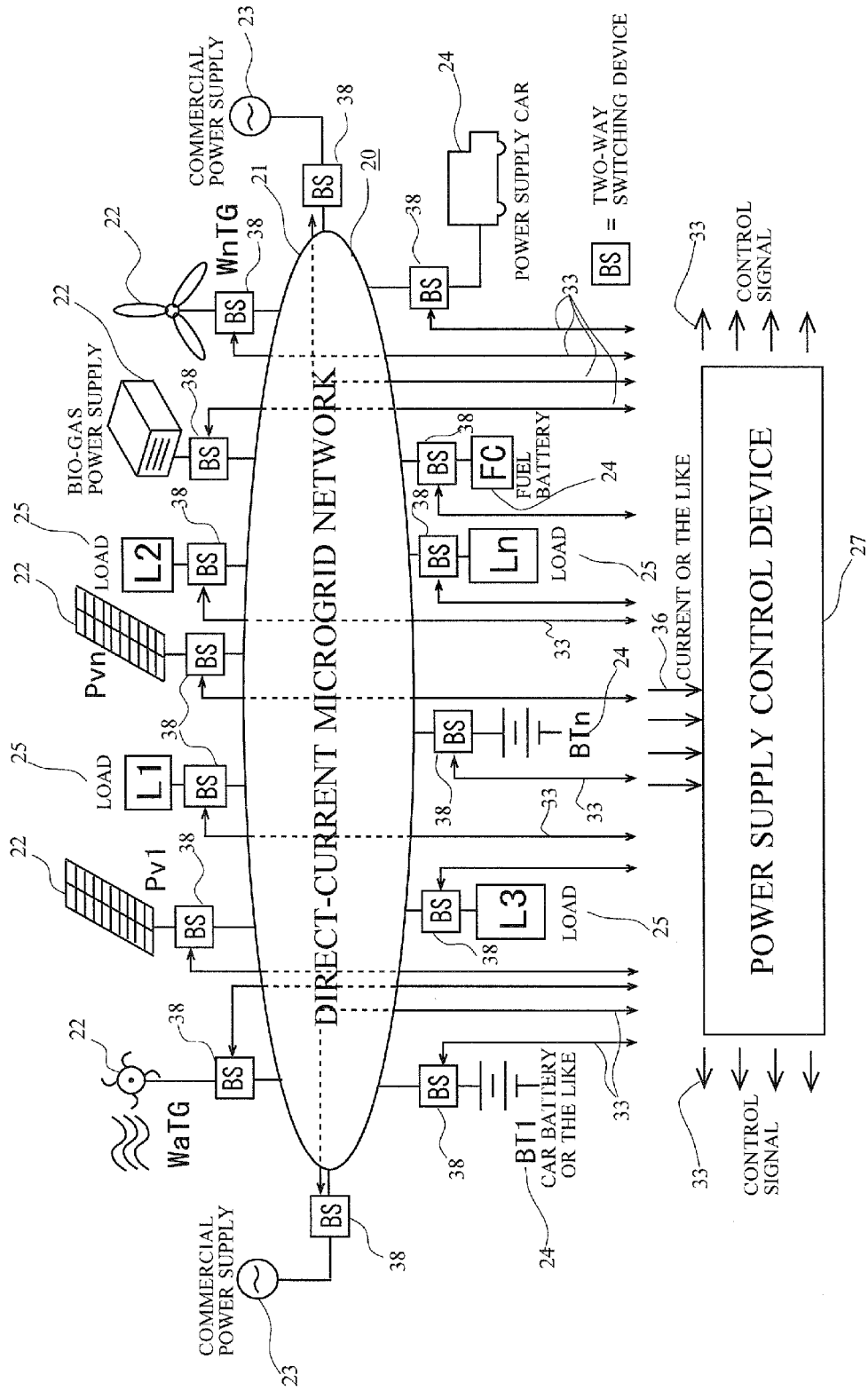
FIG. 8 A schematic illustrative diagram illustrating an example of a direct-current microgrid network according to the present invention.

In FIG. 8, symbol 20 represents the direct-current microgrid network of the present invention. In the direct-current microgrid network 20, a plurality of and a plurality of types of direct-current power generation devices 22 . . . that generate direct-current power are connected to, for example, a loop-shaped direct-current bus 21.

In FIG. 8, as examples of the direct-current power generation devices 22 that generate direct-current power, a hydroelectric generator, a wind generator, a solar battery, a fuel battery, a bio-gas generator and the like are shown. However, the direct-current power generation devices 22 are not limited to these devices at all as long as devices can generate direct-current power.

Symbol 23 represents an alternating-current commercial power supply that is converted into direct-current power, and in the present example, for example, two commercial power supplies 23 that are converted into direct-current power are connected to the direct-current bus 21. As the commercial power supplies 23 that are converted into direct-current power, the commercial power supplies 23 of so-called different power companies may be connected or the commercial power supplies 23 of different substations may be connected. When as described above, a plurality of commercial power supplies 23 that are converted into direct-current power are connected, even if one of the commercial power supplies 23 becomes slightly overloaded, one of the commercial power supplies 23 is slightly subjected to a tilt phenomenon or a power failure or the like occurs, they are covered by the other commercial power supplies 23 connected, with the result that it is possible to remove the worry described above.

Symbol 24 represents a plurality of direct-current power supplies that output direct-current power. As the direct-current power supplies 24 that output direct-current power, power storage devices and the like such as a car battery and a battery also apply. The direct-current power supplies 24 that are these power storage devices exert their functions in an emergency or when the generated power within the direct-current microgrid exceeds power used by the direct-current operating load device, and are expected as so-called backup power supplies. This assures the high reliability of the direct-current microgrid network 20 according to the present invention.

Furthermore, in addition to the backup power supplies, the direct-current power supplies 24 achieve the function of a complement device that minimizes, for example, a disadvantage in which the above-described direct-current power generation devices 22 . . . , such as a solar battery, utilizing natural energy cannot generate a desired amount of power due to, for example, shortage of amount of solar radiation.

Symbol 25 represents direct-current operating load devices that receive the supply of direct-current power from a plurality of direct-current power generation devices 22 . . . that generate direct-current power, such as a hydroelectric generator, a wind generator, a solar battery, a fuel battery and a bio-gas generator, the alternating-current commercial power supplies 23 that are converted and a plurality of direct-current power supplies 24 . . . that output direct-current power and that include power storage devices such as a car battery and a battery. Examples thereof include a direct-current LED lamp, a direct-current fluorescent lamp, a direct-current heater and a direct-current fan that are operated by direct-current power.

Figure 5:
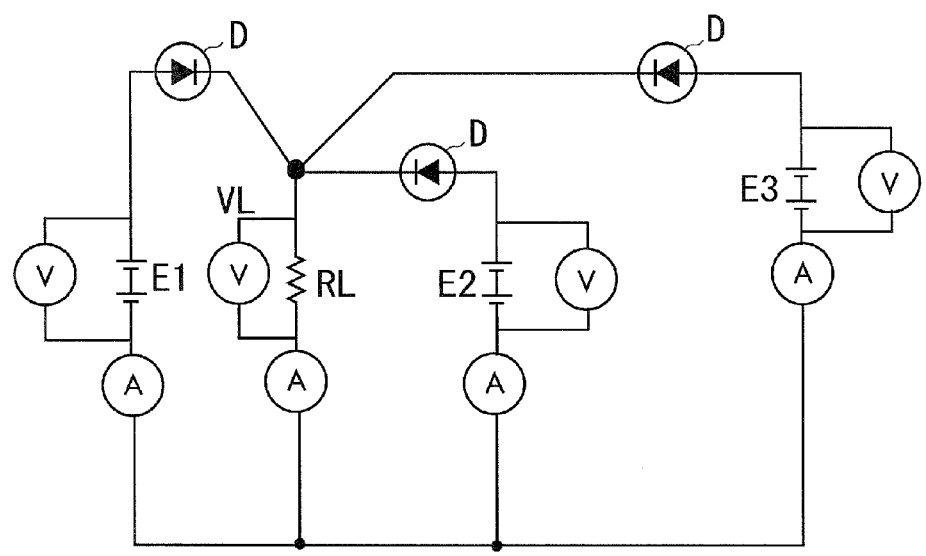
FIG. 5 A configuration illustrative diagram illustrating the basic configuration of the direct-current power supply utilizing system according to the present invention (part 1)

Incidentally, as is understood from FIG. 5 shown as a basic conceptual diagram, a plurality of direct-current power generation devices 22 . . . that generate direct-current power, such as a hydroelectric generator, a wind generator, a solar battery, a fuel battery and a bio-gas generator, the alternating-current commercial power supplies 23 that are converted and a plurality of direct-current power supplies 24 . . . that output direct-current power and that include power storage devices such as a car battery and a battery, which are described above, can supply combined direct-current power to a plurality of direct-current operating load devices 25 . . . described above.

A description will be given with reference to FIG. 5. The back-flow prevention diodes D are respectively connected to three direct-current power supplies E1, E2 and E3, which are three direct-current power generation devices 22 . . . , and the combined direct-current power is output to RL that is the direct-current load device 25. Which one of the outputs from the direct-current power generation devices 22 is prioritized is performed by making the terminal voltages differ. Specifically, as shown in FIG. 6, a setting is made such that the terminal voltage of E1 is 12.30 V, the terminal voltage of E2 is 12.25 V and the terminal voltage of E3 is 12.26 V.

At the terminal voltages described above, currents shown in FIG. 6 flowed through the E1, E2 and E3. Specifically, a current of 24.78 mA flowed through E1, a current of 6.450 mA flowed through E2 and a current of 12.26 mA flowed through E3. As described above, it is understood that the current flows in descending order of the terminal voltage.

Hence, which one of the direct-current power generation devices 22 . . . , the alternating-current commercial power supplies 23 that are converted and a plurality of direct-current power supplies 24 that output direct-current power and that are formed with power storage devices such as a car battery and a battery is prioritized can be selected and determined by connecting the back-flow prevention diodes D and making the terminal voltages differ.

As described above, FIG. 7 is a graph when two power supplies out of the E1, E2 and E3 are used, and it can be understood that the current flows in descending order of the terminal voltage.

Figure 9:
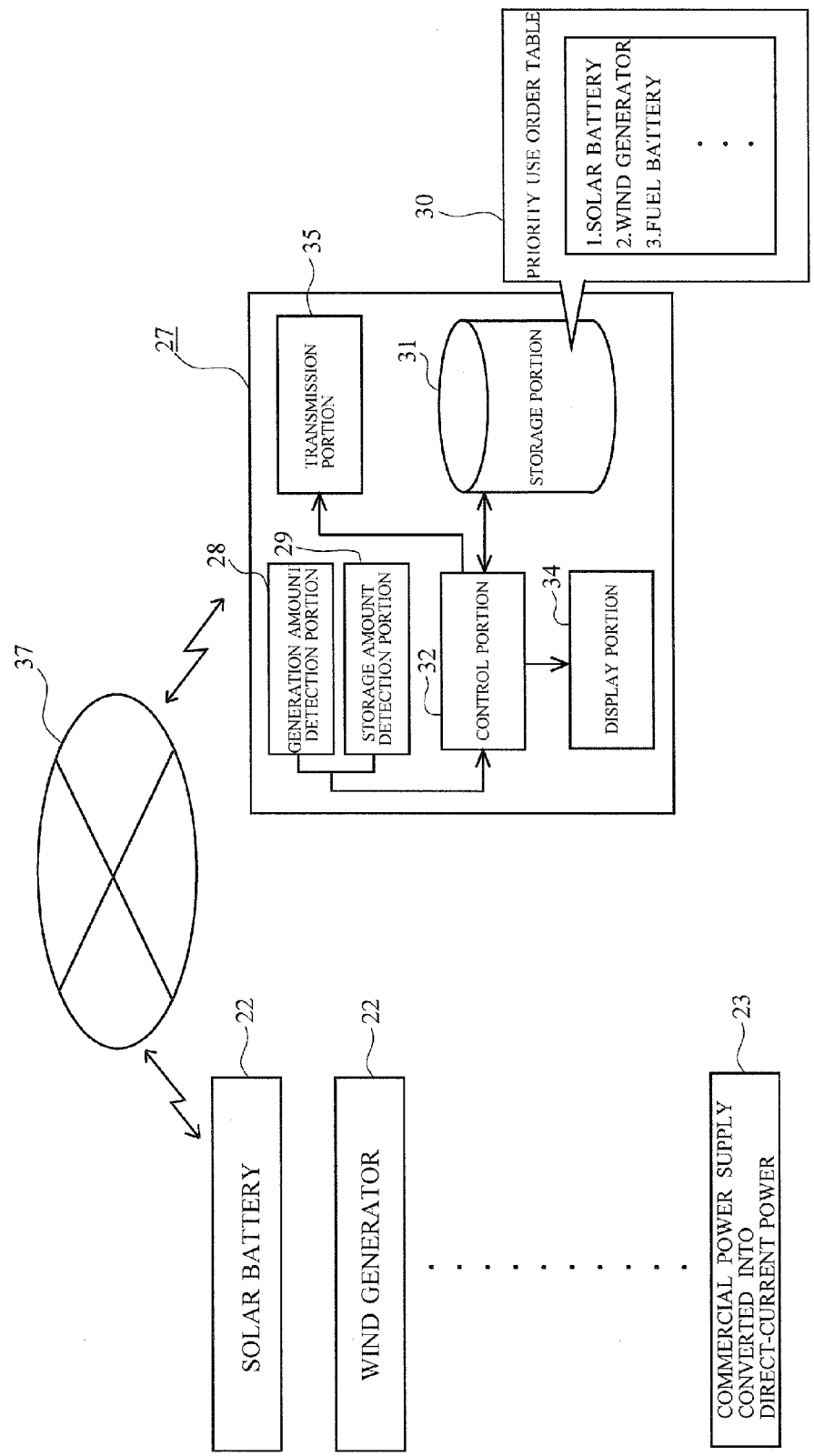
FIG. 9 A block diagram illustrating a schematic configuration of the direct-current microgrid network according to the present invention.

In FIGS. 8 and 9, symbol 27 represents a power supply control device.

Here, as is understood from FIGS. 8 and 9, the power supply control device 27 can constantly acquire information on all the devices connected to the direct-current microgrid network of the present invention, can provide an instruction of operation and can provide an instruction of power storage, an instruction of power coordination and the like.

Although the solar battery is a device that is desired to be used as a power supply, generated power significantly varies depending on the amount of solar radiation. Since as described above, the amount of power generated by the solar battery varies depending on the amount of solar radiation, variations in a detection signal 36 such as for the corresponding current or voltage are detected, for example, a control method such as a so-called maximum generated power follow control method is utilized to perform the detection operation, and thus the cost of power generation by the solar battery under general conditions is determined.

Since a wind generator is also a device that can prevent global warming, it is also as device that is desired to be used as a power generation device. However, since the amount of power generated by a wind generator also varies depending on the magnitude of wind power, the corresponding current or voltage is detected, and the cost of power generation under general conditions is determined.

Since the amount of power generated by a fuel battery, a bio-gas generator or the like does not vary depending on the amount of solar radiation or the magnitude of wind power like a solar battery or a wind generator but their fuel cost or the like may vary, with consideration given to that point, the cost of power generation under general conditions is determined.

Although the direct-current power supplies 24 that are the power storage devices such as a car battery and a battery are backup power supplies and are not often used, since they are likely to be used in an emergency, when sufficient power is available, with consideration given to the efficiency of charge and discharge under general conditions, the cost of power generation is determined.

With respect to the alternating-current commercial power supplies, in order for the cost of power generation to be compared with that of the solar battery or the wind generator described above, the cost of power generation under general conditions is determined.

Then, the determined costs of power generation are arranged in ascending order of costs, and this is produced as a priority use order table of power supply, a so-called priority use order table 30, and is previously stored in a storage portion 31.

Since the fuel cost and the like vary with time, they are preferably updated periodically.

The power supply control device 27 includes a generation amount detection portion 28 that detects how much power is generated or stored at present by a plurality of direct-current power generation devices 22 that generate direct-current power, such as a hydroelectric generator, a wind generator, a solar battery, a fuel battery and a bio-gas generator.

The power supply control device 27 also includes a storage amount detection portion 29 that detects how much direct-current power is stored by a plurality of direct-current power supplies 24 formed with power storage devices such as a car battery and a battery.

They can perform real-time detection, continuously detect the current value and the voltage value and can detect the generation amount and the storage amount in the device, especially the real-time generation amount corresponding to the varying amount of solar radiation and wind power.

Then, their information is fed out to a control portion 32.

The control portion 32 references the input information and the priority use order table 30 stored in the storage portion 31, and computes which one of direct-current power generation devices 22 is prioritized, at present, to generate power, which one of the direct-current power supplies 24 is used, which one of the commercial power supplies 23 is used and how much they are used in order to complement the power generation.

As an example, in the present example, the use of the solar battery is prioritized the most. Moreover, in FIG. 8, two solar batteries are used, the real-time amounts of power generated by the solar batteries are detected and the use of the solar battery that generates power the most at present is prioritized. However, since it is impossible to compensate for the amount of power generated with one of the solar batteries, the use of the other solar battery is intended. Also in this case, the amount of power generated by the other solar battery is detected, and how much power can be supplied is computed by the control portion 32. The control of power supply on the wind generation is likewise performed by the control portion. Symbol 34 represents a display portion such as a display, and symbol 35 represents a transmission portion that feeds out a control signal 33.

Here, the generation amount detection portion 28, the storage amount detection portion 11 and the control portion 32 are formed with, for example, a central processing unit such as a CPU, and the storage portion 31 is formed with a hard disk or the like.

The power supply priority use order and the like determined by the control portion 32 are fed out with a control signal 15 or the like to a plurality of types of direct-current power generation devices 22 . . . that generate direct-current power, such as a hydroelectric generator, a wind generator, a solar battery, a fuel battery and a bio-gas generator shown in FIG. 8, the alternating-current commercial power supplies 23 that are converted into direct-current power and a plurality of direct-current power supplies 24 that output direct-current power, and a switching device 38 and the like feed, according to the power supply described above, predetermined power out to the side of the direct-current operating load devices 25. Although the input and output of the signal is performed through a line network 37, the present invention is not limited to this configuration, and it may be performed with priority.

Figure 10:
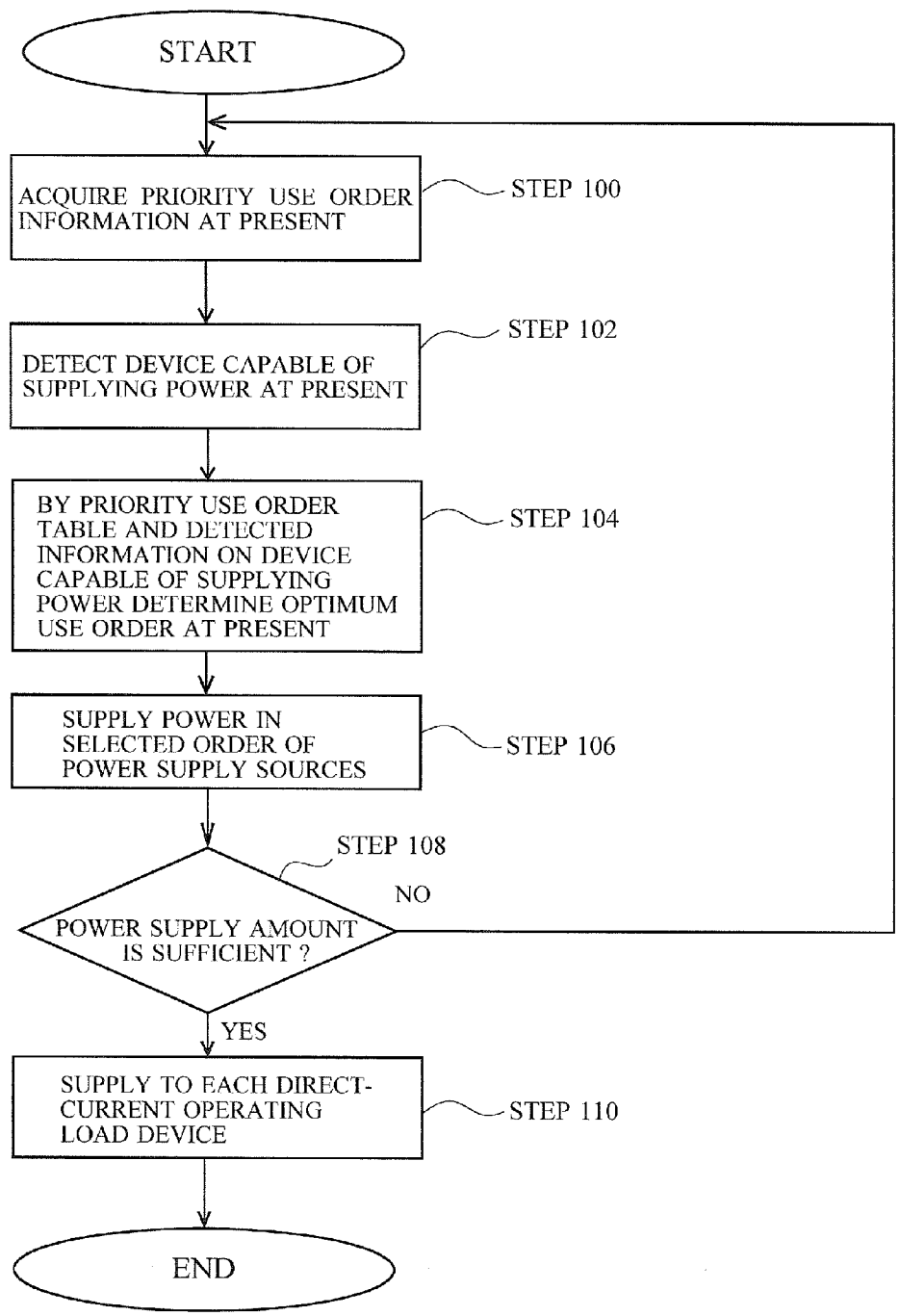
FIG. 10 A flowchart illustrating the operation of a power supply control device of the direct-current microgrid network according to the present invention.

The operation of the power supply control device 27 according to the present invention will now be described with reference to FIG. 10.

The priority use order information on the individual devices is first acquired from the priority use order table 30 stored at present in the storage portion 31 of the power supply control device 27 (step 100).

Then, based on information on the generation amount or the storage amount in the individual devices detected by the generation amount detection portion 28 or the storage amount detection portion 29, the individual devices that can supply power at present are detected (step 102).

The optimum priority use order of the individual devices is determined by the priority use order information on the individual devices acquired from the priority use order table 30 described above and the information on the individual devices that can supply power detected by the generation amount detection portion 28 or the storage amount detection portion 29, in terms of the management of the devices such as the low cost of the power supply at present or the stability of the power supply, as a result of all types of information being totally considered (step 104). Then, the power supply is performed in order of the individual devices selected and determined above, that is, the power supply sources (step 106).

Here, whether or not the supply amount is sufficient by the power supply from the power supply sources described above is determined (step 108), and if it is determined not to be sufficient (no in step 108), the operation in step 100 described above is performed again.

Then, if the supply amount is determined to be sufficient by the power supply from the power supply sources described above (yes in step 108), power is supplied to the direct-current operating load devices 25 (step 110).

Incidentally, in the present invention, on the side of the commercial power supplies 23, a reverse conversion device (not shown) that is formed with, for example, a power conditioner capable of performing power reverse power flow. The reverse conversion device is configured such that reverse power flow can be performed to the side of the commercial power supplies 23 when the amount of power generated by a plurality of direct-current power generation devices 22 . . . which generate the power of the direct-current microgrid network 20 of the present invention exceeds the amount of power consumed by the direct-current operating load devices 25 and the amount of power stored in the direct-current power supplies 24.

INDUSTRIAL APPLICABILITY

One microgrid is formed with a plurality of microgrids combined with other microgrids, and thus the following effect or the like is produced, the decrease in the quality of power such as variations in voltage on rapid variations in load within the network is reduced by a factor of the number of microgrids.

LIST OF REFERENCE SYMBOLS 1 solar battery
2 auxiliary solar battery
3 direct-current load device
4 capacitor
4a charge/discharge control device
5 pulse width modulation direct-current chopper
6 microcomputer
7 back-flow prevention diode
8a smoothing reactor
8b high-frequency reactor
9a smoothing capacitor
9b high-frequency capacitor
10 commercial power supply
11 commercial power supply rectifier
PV solar battery
D back-flow prevention diode
E1, E2, . . . and En direct-current power supplies
RL direct-current load device
20 direct-current microgrid network
21 direct-current bus
22 direct-current power generation device
23 commercial power supply converted into direct-current power
24 direct-current power supply
25 direct-current operating load device
27 power supply control device
28 generation amount detection portion
29 storage amount detection portion
30 priority use order table
31 storage portion
32 control portion
33 control signal
34 display portion
35 transmission portion
36 detection signal
37 line network
38 switching device

The invention claimed is:

1. A direct-current power supply utilizing system comprising:
   at least one direct-current power supply that produces a direct-current output;
   an alternating-current commercial power supply;
   a direct-current converter that converts the alternating-current commercial power supply into direct-current power supply; and
   a direct-current load device that receives supply of direct-current power from both the at least one direct-current power supply and the commercial power supply which has been converted into direct-current power,
   wherein a back-flow prevention diode is individually connected between the at least one direct-current power supply and the direct-current load device and between the direct-current converter and the direct-current load device, and a power supply priority supply device that prioritizes the supply of power to the direct-current load device from each direct-current power supply and the direct-current converter by setting a terminal voltage of each direct power supply and the direct-current convert to be a different value with respect to each other.

2. The direct-current power supply utilizing system of claim 1,
   wherein the power supply priority supply device is a voltage adjustment device that is connected to a side of the commercial power supply which has been converted into direct-current power.

3. The direct-current power supply utilizing system of claim 1,
   wherein the direct-current power supply includes: a direct-current power supply that is obtained by full-wave rectifying the commercial power supply or converting the commercial power supply into direct-current power with a pulse width modulation DC converter; a direct-current wind generator or a direct-current wind generator that is obtained by full-wave rectifying if the wind generator performs alternating-current power generation; a direct-current fuel battery; a direct-current bio-gas generator; and a storage battery including a capacitance or charge/discharge control device.

4. A direct-current power supply utilizing system comprising:
   at least one direct-current power supply that produces a direct-current output;
   an alternating-current commercial power supply;
   a direct-current converter that converts the alternating-current commercial power supply into direct-current power; and
   a direct-current load device that receives supply of direct-current power from both the at least one direct-current power supply and the commercial power supply which has been converted into direct-current power,
   wherein a back-flow prevention diode is individually connected between the at least one direct-current power supply and the direct-current load device and between the direct-current converter and the direct-current load device, and a power supply priority supply device that prioritizes the supply of power to the direct-current load device from each direct-current power supply and the direct-current converter by setting a terminal voltage of each direct power supply and the direct-current convert to be a different value with respect to each other, and
   the at least one direct-current power supply that produces the direct-current output is a solar battery, and the solar battery includes a solar radiation amount detection member that detects a varying amount of solar radiation and a generated power amount control device that utilizes, from the detected value, as much as possible, power generated from the solar battery according to the varying amount of solar radiation.

5. The direct-current power supply utilizing system of claim 4,
   wherein the solar radiation amount detection member is formed with a solar battery panel of the solar battery or is formed with a solar battery formed with another solar battery panel.

6. The direct-current power supply utilizing system of claim 4,
   wherein the generated power amount control device is a control device that obtains, for the generated power of the solar battery which is increased or decreased according to the varying amount of solar radiation, the maximum generated power corresponding to the varying amount of solar radiation,
   a graph is previously formed in which a variation in the amount of solar radiation in the solar battery is on a horizontal or vertical axis and a variation in the maximum output current value from the solar battery at the time of the maximum generated power corresponding to the variation in the amount of solar radiation is on the vertical or horizontal axis, the maximum output current value at the time of the maximum generated power in 1000 W/square meters at the time of the maximum amount of solar radiation in the solar battery is determined and is placed at one point on the graph and the one point and an origin of the graph are connected, and a linear target value of the maximum output current value indicating the maximum generated power of the solar battery corresponding to the varying amount of solar radiation is formed, the varying amount of solar radiation detected by the solar radiation amount detection member and an actual output current value obtained from the solar battery corresponding to the amount of solar radiation are detected and the power supply priority supply device is operated to perform control such that the obtained actual output power value is to be an output current target value corresponding to the amount of solar radiation obtained from the graph.

7. The direct-current power supply utilizing system of claim 6, wherein the power supply priority supply device is formed with a pulse width modulation direct-current chopper that is a voltage adjustment device, performs a proportional derivative integral control computation to determine a conduction ratio of the pulse width modulation direct-current chopper, performs current adjustment with the conduction ratio determined by the computation and performs control such that the actual output current value from the solar battery is to be the output current target value.

8. The direct-current power supply utilizing system of claim 4, wherein the direct-current power supply includes: a direct-current power supply that is obtained by full-wave rectifying the commercial power supply or converting the commercial power supply into direct-current power with a pulse width modulation DC converter; a direct-current wind generator or a direct-current wind generator that is obtained by full-wave rectifying if the wind generator performs alternating-current power generation; a direct-current fuel battery; a direct-current bio-gas generator; and a storage battery including a capacitance or charge/discharge control device.

9. A direct-current microgrid network comprising:

a plurality of direct-current power generation devices that combine and feed out direct-current power and that generate direct-current power;

an alternating-current commercial power supply that has been converted into direct-current power;

a direct-current operating load device that receives supply of the combined direct-current power;

a direct-current bus that connects the direct-current power generation devices, the commercial power supply and the direct-current operating load device; and a power supply priority supply device that prioritizes the supply of power to the direct-current load device from each direct-current power supply and the alternating-current commercial power supply that has been converted into direct-current power by setting a terminal voltage of each direct power supply and the alternating-current commercial power supply that has been converted into direct-current power to be a different value with respect to each other, wherein a priority use order table of power supply is provided for the direct-current power generation devices such that the direct-current power supply to the direct-current operating load device is performed in ascending order of a power generation cost, and a power supply control device is included that detects a real-time power generation amount of the direct-current power generation devices corresponding to the real-time power generation cost in the direct-current power generation devices, that references the detection result and the priority use order table to determine a real-time optimum supply selection order of the direct-current power generation devices and that supplies power to the direct-current load device.

10. The direct-current microgrid network of claim 9, wherein the direct-current power supply to the direct-current operating load device by combining the direct-current power is performed by individually attaching a back-flow prevention diode to the direct-current power generation devices which generate the direct-current power and the alternating-current commercial power supply which has been converted into direct-current power, then combining the direct-current power supplied therefrom and supplying the combined direct-current power.

11. The direct-current microgrid network of claim 9, wherein the direct-current power generation devices include at least a solar battery, a fuel battery, a wind generator, a hydroelectric generator and a bio-gas generator.

12. The direct-current microgrid network of claim 9, wherein the direct-current power supply device is a power storage device including a car battery.

13. The direct-current microgrid network of claim 9, wherein in the commercial power supply, a reverse conversion device capable of performing power reverse power flow is provided, and the reverse conversion device performs the reverse power flow on the commercial power supply when an amount of power generated by a plurality of direct-current power generation devices which generate the power of the direct-current microgrid network exceeds an amount of power consumed by the direct-current operating load device and an amount of power stored in the direct-current power supply.

14. A direct-current microgrid network comprising:

a plurality of direct-current power generation devices that generate direct-current power;

a direct-current power supply device that outputs direct-current power;

an alternating-current commercial power supply that has been converted into direct-current power;

at least one direct-current operating load device that receives supply of direct-current power combined by the direct-current power generation devices, the direct-current power supply device and the commercial power supply which has been converted into direct-current power;

a direct-current bus that connects the direct-current power generation devices, the direct-current power supply device, the commercial power supply and the direct-current operating load device; and a power supply priority supply device that prioritizes the supply of power to the direct-current load device from each direct-current power generation devices, direct-current power supply and the alternating-current commercial power supply that has been converted into direct-current power by setting a terminal voltage of each direct-current power generation device, direct power supply and the alternating-current commercial power supply that has been converted into direct-current power to be a different value with respect to each other, wherein a priority use order table of power supply is provided in the direct-current power generation devices, the direct-current power supply device and the commercial power supply which has been converted into direct-current power such that the direct-current power supply to the direct-current operating load device is performed in ascending order of a power generation cost, and a power supply control device is included that detects a real-time power supply allowable amount of the direct-current power generation devices, the direct-current power supply device and the commercial power supply which has been converted into direct-current power corresponding to the real-time power generation cost in the direct-current power generation devices, the direct-current power supply device and the commercial power supply which has been converted into direct-current power, that references the detection result and the priority use order table to determine a real-time optimum supply selection order of the direct-current power generation devices, the direct-current power supply device and the commercial power supply which has been converted into direct-current power and that supplies power to the direct-current load device.

15. The direct-current microgrid network of claim 14,
wherein the direct-current power supply to the direct-current operating load device by combining the direct-current power is performed by individually attaching a back-flow prevention diode to the direct-current power generation devices which generate the power, the direct-current power supply and the alternating-current commercial power supply which has been converted into direct-current power, then combining the direct-current power supplied therefrom and supplying the combined direct-current power.

16. The direct-current microgrid network of claim 14,
wherein the direct-current power generation devices include at least a solar battery, a fuel battery, a wind generator, a hydroelectric generator and a bio-gas generator.

17. The direct-current microgrid network of claim 14,
wherein the direct-current power supply device is a power storage device including a car battery.

18. The direct-current microgrid network of claim 14,
wherein in the commercial power supply, a reverse conversion device capable of performing power reverse power flow is provided, and
the reverse conversion device performs the reverse power flow on the commercial power supply when an amount of power generated by a plurality of direct-current power generation devices which generate the power of the direct-current microgrid network exceeds an amount of power consumed by the direct-current operating load device and an amount of power stored in the direct-current power supply.

* * * * *